United States Patent Office 3,595,958
Patented July 27, 1971

3,595,958
STABLE NALED DUSTS
Theodore H. Koundakjian, Berkeley, and John R. Mattox, Sausalito, Calif., assignors to Chevron Research Company, San Francisco, Calif.
No Drawing. Filed Oct. 12, 1966, Ser. No. 586,049
Int. Cl. A01n 9/36
U.S. Cl. 424—225                                  5 Claims

ABSTRACT OF THE DISCLOSURE

Free-flowing pesticidal dust comprising naled, a calcined, anhydrous alkaline earth metal sulfate as a carrier and a micro silica as a flow agent.

---

This invention is directed to an insecticidal dust composition. More particularly, it relates to an insecticidal dust composition containing naled.

Naled dimethyl-1,2-dibromo-2,2-dichloroethyl phosphate is a unique compound. It has a broad spectrum of insecticidal activity while having low mammalian toxicity. However, naled has one important drawback—it is very susceptible to chemical degradation. Because of its liability, naled has been difficult to formulate, especially as a dust, into compositions which are sufficiently stable to endure any appreciable storage periods. Previously used insecticidal dusts of naled with mineral carriers such as pyrophyllite, attapulgite, talc and kaolin rapidly lose a significant portion or all of their insecticidal power within a very short time. This problem is compounded by the fact that the conventional chemical stabilizers which are used with solid phosphate insecticide formulations have not been effective when applied to naled dust.

A unique naled dust formulation has now been found which is free-flowing and stable for periods greatly in excess of previously used naled dusts. This novel insecticidal dust composition comprises naled, anhydrous alkaline earth metal sulfate and micro silica. The alkaline earth metal sulfate may be anhydrous barium sulfate, anhydrous calcium sulfate, anhydrous magnesium sulfate, etc. Preferably it is anhydrous calcium sulfate. "Anhydrous" is not to be confused with the naturally-occurring material "anhydrite." Anhydrite contains small amounts of water.

The anhydrous alkaline earth metal sulfate may be made by calcining a naturally-occurring or synthetic hydrated sulfate such as gypsum or plaster of Paris. The calcination will normally be done at temperatures in the range of 205–300° C. Hydrated calcium sulfates which have been heated to a point where they lose sulfur trioxide to leave free lime are not desirable.

The micro silica is an essential component of the dust of this invention. Without the silica the dust has poor consistency, flow properties and poor absorbancy at naled concentrations greater than about 5%. The micro silica does not have a significant adverse effect upon the dust. In contrast, conventional fillers and flow agents such as diatomaceous earth, calcium stearate and calcium silicate either failed to give better flow properties or caused the dust to be significantly unstable. The micro silica of this invention normally has a particle size in the range of about .005 to about 0.05 micron. It may be made by heating silicon tetrahalide, e.g. silicon tetrachloride, in the presence of oxygen and condensing the silica vapor on a cool surface. This micro silica is sometimes referred to as "fumed" or "pyrogenic" silica. Micro silica may also be prepared by precipitating hydrated silicon dioxide by controlled hydrolysis of silicon tetrachloride.

The dust compositions of this invention comprise about 0.5 to about 40 weight percent naled, about 0.5 to about 30 weight percent micro silica and about 30 to 99 weight percent anhydrous alkaline earth metal sulfate. The relative amounts of silica and sulfate in a given composition will be correlated with the amount of naled to be absorbed. A preferred dust composition comprises about 2 to 6 weight percent naled, about 1 weight percent pyrogenic silica and the remainder anhydrous calcium sulfate.

The dust compositions of this invention may be formulated conveniently in the following manners: Powdered calcium sulfate is blended in the desired proportions with the micro silica. Naled is sprayed onto this mixture while the latter is being turned over or agitated until the desired toxicant concentration is reached. Naled is normally sprayed onto the sulfate-silica mixture in a solution with a suitable solvent such as xylenes, methylene chloride and triethylphosphate. The final mixture is milled to insure uniformity. Alternatively, the naled solution may be blended with the sulfate-silica mixture by mixing followed by milling to insure homogeneity. Or the naled solution may be sprayed onto the micro silica and the sulfate added thereafter. As before the final product will desirably be milled to assure uniformity.

The following examples illustrated the dusts of this invention and their unique stability as compared to other naled dusts. These examples are presented only to illustrate the invention and are not meant to limit it in any manner.

EXAMPLE 1

To test shelf stability, 9.41 g. of a naled-xylene solution containing 85% naled were blended with 190.59 g. of calcined calcium sulfate in a Waring Blendor to give a 4% naled dust. This blend was analyzed immediately after blending for naled content. The analysis was made by extracting a small sample of dust with benzene and analyzing the extract by gas liquid chromatography to determine naled content. The blend was then put in a glass container at 100° F. and tested at various times for naled content by the method described above. Naled was similarly blended as a dust with other carriers and tested for shelf-stability in the manner described above. The results of these tests using 4% as a 100 base are reported in Table I.

TABLE I

| Carrier, description | Percent naled/days at 100° F. | | | |
|---|---|---|---|---|
| Calcined CaSO₄, anhydrous gypsum | 100/0 | 100/3 | 96/7 | 91/51 |
| CaSO₄·2H₂O, natural gypsum | 100/0 | 39/4 | 25/11 | |
| Pyrophyllite (325), a fine particle size pyrophyllite 95%/325 mesh screen | 96/0 | 34/4 | 26/10 | |
| Bentonite 325, a montmorillonoid clay of fine particle size | 80/0 | 50/3 | 29/13 | |
| Pike's Peak T6, a calcined montmorillonoid clay of fine particle size 95%/325 mesh screen | 87/0 | 38/3 | 23/7 | |
| Attaclay X250, a hydrated magnesium aluminum silicate (Attapulgite) clay of 1.2 microns average particle size | 72/0 | 7/3 | 3/7 | |
| Talc 961, a magnesium silicate mineral with average particle size of 1.5 microns | 97/0 | 44/4 | 37/8 | |
| Agri F-2, an inert aluminum silicate (kaolin) mineral 85%/325 mesh screen | 95/0 | 68/4 | 61/8 | |
| Kaolin No. 22, a fine particle size kaolin clay 99%/325 mesh screen | 86/0 | 39/5 | 35/12 | |
| Celite 360, a diatomite mineral of fine particle size 96% less than 20 microns | 71/0 | 42/4 | | |

EXAMPLE 2

5.3 g. of a naled-xylene solution (85% naled), 93.7 g. calcined calcium sulfate and 1.0 g. of micro silica having a particle size in the range of 0.007–0.012 micron were blended in a Waring Blendor. The resulting dust and excellent consistency and flow properties. By the method described in Example 1 this dust was tested for shelf stability. The results were as follows:

$$100/0 \; \frac{\% \; \text{Naled/Days at } 100°\text{F}}{98/14} \; 94/67$$

EXAMPLE 3

A solution of 5.0 lbs. of methylene chloride and 17.8 lbs. of naled technical (94% pure) was sprayed onto 7.2 lbs. of micro silica having a particle size in the range of 0.007–0.012 micron, 25.0 lbs. of anhydrous gypsum was blended into the mixture as the product was milled through a hammer mill to ensure uniformity. The final product contained 33.5% naled by weight (the methylene chloride was removed from the dust by evaporation during blending). The resulting dust had excellent flow and stability properties.

We claim:

1. A stable solid free-flowing insecticidal dust comprising about .5 to 40 weight percent of naled, about 30 to 99 weight percent calcined, anhydrous alkaline earth metal sulfate and about .5 to 30 weight percent micro silica.

2. The dust of claim 1 wherein the alkaline earth metal sulfate is calcium sulfate.

3. The dust of claim 1 wherein the particle size of the silica is in the range of .005 to .05 micron.

4. The dust of claim 1 wherein the micro silica is pyrogenic silica.

5. The dust of claim 1 wherein the naled comprises about 2 to 6 wt. percent naled, the silica comprises about 1 wt. percent of the dust and anhydrous calcium sulfate comprises the remainder.

References Cited

UNITED STATES PATENTS

| | | | |
|---|---|---|---|
| 3,168,437 | 2/1965 | Calloway | 167—42 |
| 3,169,905 | 2/1965 | Lambert | 167—42 |
| 3,278,373 | 10/1966 | Baker | 167—42X |
| 3,364,109 | 1/1968 | Haering | 167—42 |

OTHER REFERENCES

Pesticidal Index, Frear, 1963; College Science Publishers, p. 75.

ALBERT T. MEYERS, Primary Examiner

L. SCHENKMAN, Assistant Examiner

U.S. Cl. X.R.

424—175, 357